United States Patent
Shultz et al.

(10) Patent No.: US 10,815,990 B2
(45) Date of Patent: Oct. 27, 2020

(54) PAINT SPRAYER PUMP CARTRIDGE

(71) Applicant: Graco Minnesota Inc., Minneapolis, MN (US)

(72) Inventors: Mark D. Shultz, Fridley, MN (US); David M. Larsen, Albertville, MN (US); Justin G. Johnston, Rogers, MN (US); Steve J. Wrobel, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/484,703

(22) Filed: Apr. 11, 2017

(65) Prior Publication Data
US 2017/0292506 A1   Oct. 12, 2017

Related U.S. Application Data

(60) Provisional application No. 62/320,838, filed on Apr. 11, 2016.

(51) Int. Cl.
| | |
|---|---|
| *F04B 53/16* | (2006.01) |
| *B05B 9/04* | (2006.01) |
| *F16K 15/04* | (2006.01) |
| *F04B 53/14* | (2006.01) |
| *F04B 53/10* | (2006.01) |
| *F04B 17/06* | (2006.01) |
| *F04B 53/02* | (2006.01) |

(52) U.S. Cl.
CPC .......... *F04B 53/164* (2013.01); *B05B 9/0413* (2013.01); *F04B 17/06* (2013.01); *F04B 53/02* (2013.01); *F04B 53/10* (2013.01); *F04B 53/14* (2013.01); *F04B 53/143* (2013.01); *F04B 53/16* (2013.01); *F16K 15/04* (2013.01)

(58) Field of Classification Search
CPC ...... F04B 53/10; F04B 53/164; F04B 53/143; F04B 53/02; F04B 53/04; F04B 53/14; F04B 53/16; F04B 53/1002; F04B 53/162; F04B 53/168; F04B 53/22; F04B 7/0266; F04B 17/06; F16K 15/04; B05B 9/0413

See application file for complete search history.

(56) References Cited

U.S. PATENT DOCUMENTS 3,049,082 A * 8/1962 Barry ...................... F04B 49/18
                                                         277/346
3,323,467 A * 6/1967 Heintz ................... F02M 41/08
                                                         417/203

(Continued)

*Primary Examiner* — Charles G Freay
(74) *Attorney, Agent, or Firm* — Kinney & Lange, P.A.

(57) ABSTRACT

A fluid dispensing system includes a motor housing and a piston pump assembly connected to the motor housing. A motor is mounted within the motor housing. The piston pump assembly includes a pump housing, a cartridge having a first end that extends into a second end of the pump housing, a piston that extends into a first end of the pump housing and the first end of the cartridge, and a packing stack within the cartridge and adjacent an inner surface of the cartridge and through which the piston extends. The cartridge is configured to be removed from the pump housing, and removal of the cartridge removes the packing stack from within the pump housing while leaving the pump housing connected to the motor housing.

20 Claims, 7 Drawing Sheets

(56) References Cited

U.S. PATENT DOCUMENTS

| | | | | |
|---|---|---|---|---|
| 3,330,217 A | * | 7/1967 | Baur | F04B 5/00 |
| | | | | 417/454 |
| 3,413,929 A | * | 12/1968 | Cook | F04B 1/0408 |
| | | | | 417/273 |
| 5,228,842 A | * | 7/1993 | Guebeli | B05B 9/0413 |
| | | | | 277/530 |
| 5,472,326 A | * | 12/1995 | Tarpley | F04B 53/005 |
| | | | | 137/533.15 |
| 5,671,656 A | * | 9/1997 | Cyphers | F04B 15/00 |
| | | | | 417/DIG. 1 |
| 6,302,401 B1 | * | 10/2001 | Palmour | F04B 53/146 |
| | | | | 277/513 |
| 6,435,846 B1 | * | 8/2002 | Cooper | F04B 17/03 |
| | | | | 417/415 |
| 2016/0069344 A1 | * | 3/2016 | Carey | F04B 53/22 |
| | | | | 417/213 |

* cited by examiner

PAINT SPRAYER PUMP CARTRIDGE

CROSS-REFERENCE TO RELATED APPLICATION(S)

This application claims the benefit of U.S. Provisional Application No. 62/320,838 filed Apr. 11, 2016 for "PAINT SPRAYER PUMP CARTRIDGE," which is fully incorporated by reference herein.

BACKGROUND

The present disclosure relates generally to fluid dispensing systems, and in particular, to a piston pump assembly for fluid dispensing systems.

Fluid dispensing systems may be used to spray materials such as paint onto a desired surface. Fluid dispensing systems such as paint sprayers often include piston pump assemblies to move paint through the system from a reservoir to a spray gun. During use, components within the piston pump assembly may wear or break. As a result, sprayers may require maintenance while in the field. Therefore, a piston pump assembly that simplifies component replacement and required field maintenance is needed.

SUMMARY

A fluid dispensing system includes a motor housing and a piston pump assembly connected to the motor housing. A motor is mounted within the motor housing. The piston pump assembly includes a pump housing, a cartridge having a first end that extends into a second end of the pump housing, a piston that extends into a first end of the pump housing and the first end of the cartridge, and a packing stack within the cartridge and adjacent an inner surface of the cartridge and through which the piston extends. The cartridge is configured to be removed from the pump housing, and removal of the cartridge removes the packing stack from within the pump housing while leaving the pump housing connected to the motor housing.

A cartridge includes a main body having a first portion and a second portion and including a piston bore, a ball cage having a first portion that extends into a second portion of the main body, an inlet having a first portion that extends into a second portion of the ball cage, a packing stack mounted within the piston bore of the main body, a valve having a ball and a seat positioned between the ball cage and the inlet, an external connector on an exterior of the main body, an external connector on an exterior of the ball cage, and an external connector on an exterior of the inlet. The external connector on the exterior of the main body is configured to engage and mate with an internal connector on an interior of a pump housing to connect the cartridge to the pump housing and configured to disengage the internal connector of the pump housing to disconnect and remove the cartridge as a unit from the pump housing while leaving the pump housing in place. The external connector on the exterior of the ball cage is configured to engage and mate with an internal connector on an interior of the main body to connect the ball cage to the main body and configured to disengage the internal connector of the main body to disconnect and remove the ball cage from the pump housing. The external connector on the exterior of the inlet is configured to engage and mate with an internal connector on an interior of the ball cage to connect the inlet to the ball cage and configured to disengage the internal connector of the ball cage to disconnect and remove the inlet from the ball cage.

A method includes disengaging mating connectors of a pump housing and a cartridge, removing the cartridge from the pump housing while leaving the pump housing and the piston in place, servicing at least one component of the cartridge, reinserting the cartridge into the pump housing, and reengaging the mating connectors of the pump housing and the cartridge to reinstall the serviced cartridge.

DETAILED DESCRIPTION

In general, the present disclosure describes a removable cartridge for use in a piston pump assembly. The cartridge contains a seal for sealing between the inner surface of the cartridge and a piston and allows for the removal and replacement of the seal while leaving a pump housing of the piston pump assembly in place. The cartridge provides access to the internal components of the piston assembly that need service while requiring less disassembly and exposure of the components of the sprayer not needing service. As such, seal replacement is quicker, easier, and capable of taking place in the field, and the potential for damage to other components of the sprayer is reduced. Piston pump assemblies can be used to pump paint, which is used herein as an exemplar. Other solutions or fluids (e.g. water, oil, stains, finishings, coatings, and solvents) can be pumped instead of paint.

Figure 1:
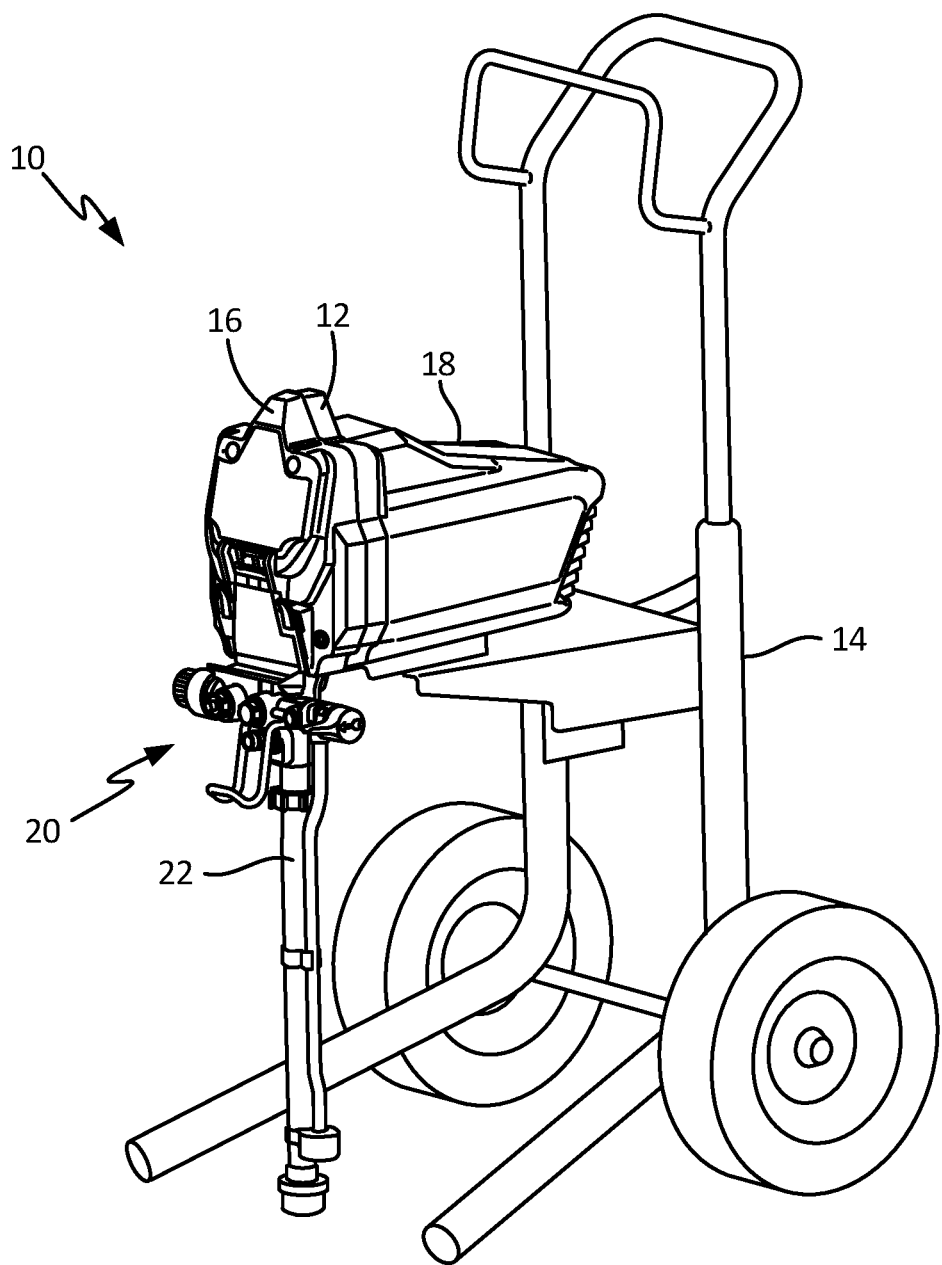
FIG. 1 is a perspective view of a sprayer.

FIG. 1 is a perspective view of sprayer 10. Sprayer 10 includes end bell 12, frame 14, front cover 16, motor housing 18, piston pump assembly 20, and intake hose 22.

End bell 12 is mounted on frame 14. Front cover 16 is attached to a front side of end bell 12 and motor housing 18 is attached to a back side of end bell 12. Front cover 16 can be secured to the front side of end bell 12 with a plurality of screws that extend through front cover 16 and screw into end bell 12. Front cover 16 can be formed as a unitary piece of metal. Piston pump assembly 20 can be mounted to a front side of end bell 12. Intake hose 22 is attached to a bottom end of piston pump assembly 20.

End bell 12 acts as a structural element to mechanically support front cover 16 and motor housing 18 on frame 14. Front cover 16 covers various components of sprayer 10, such as the reciprocation mechanism that converts a rotational output motion of the motor to a linear reciprocating motion that drives piston pump assembly 20, which includes gears, a crank, an eccentric, and a yoke. Motor housing 18 contains an electric motor (not shown) to drive piston pump assembly 20. In alternative embodiments, a gas motor can be used to drive piston pump assembly 20. End bell 12 also supports piston pump assembly 20. Piston pump assembly 20 causes intake hose 22 to suck paint out of a reservoir and deliver it to piston pump assembly 20. The paint is further directed through piston pump assembly 20 and out of piston pump assembly 20 through a hose (not shown) to a gun assembly (not shown) for spraying on a desired surface.

Figure 2:
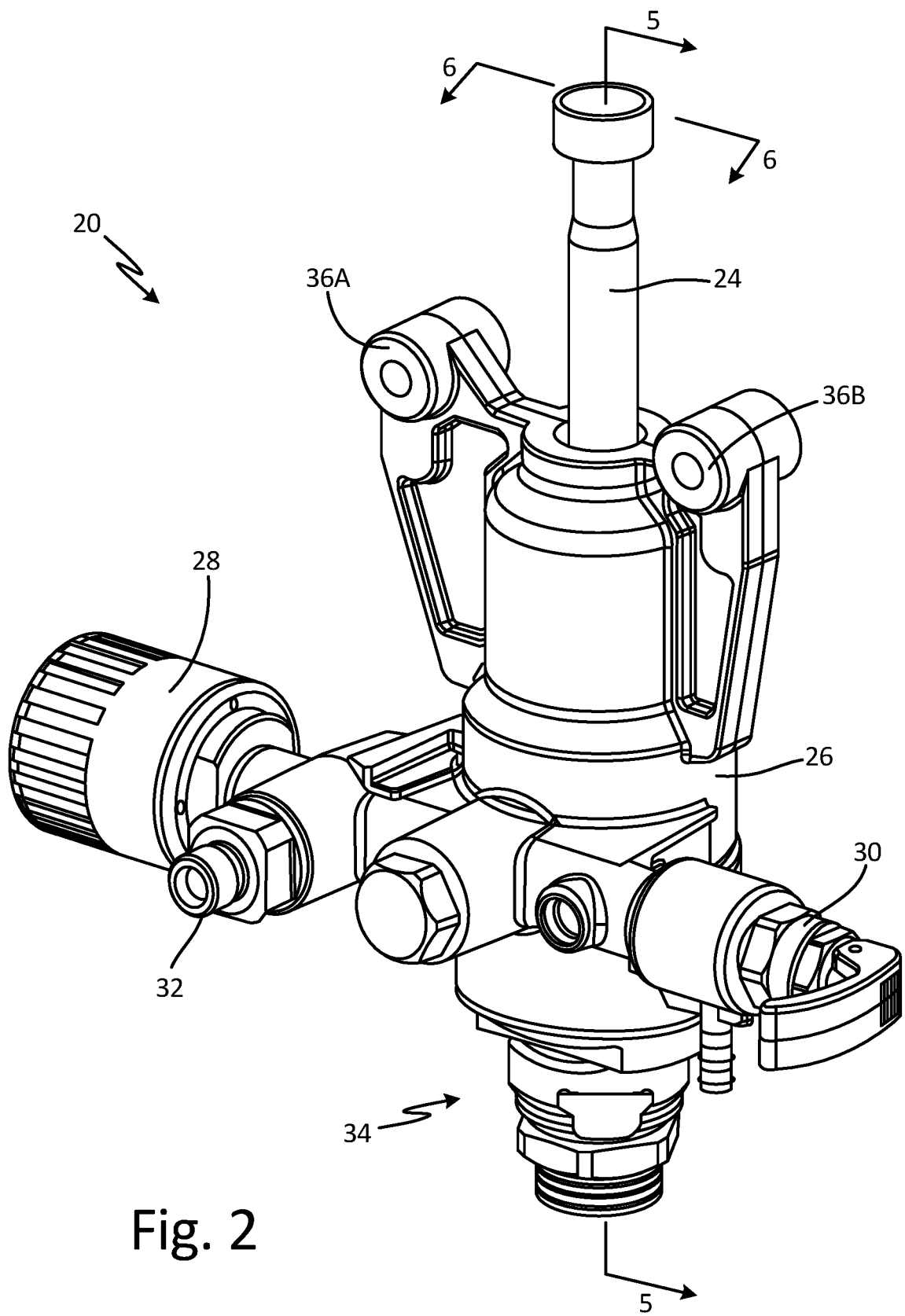
FIG. 2 is a perspective view of a piston pump assembly.
Figure 3:
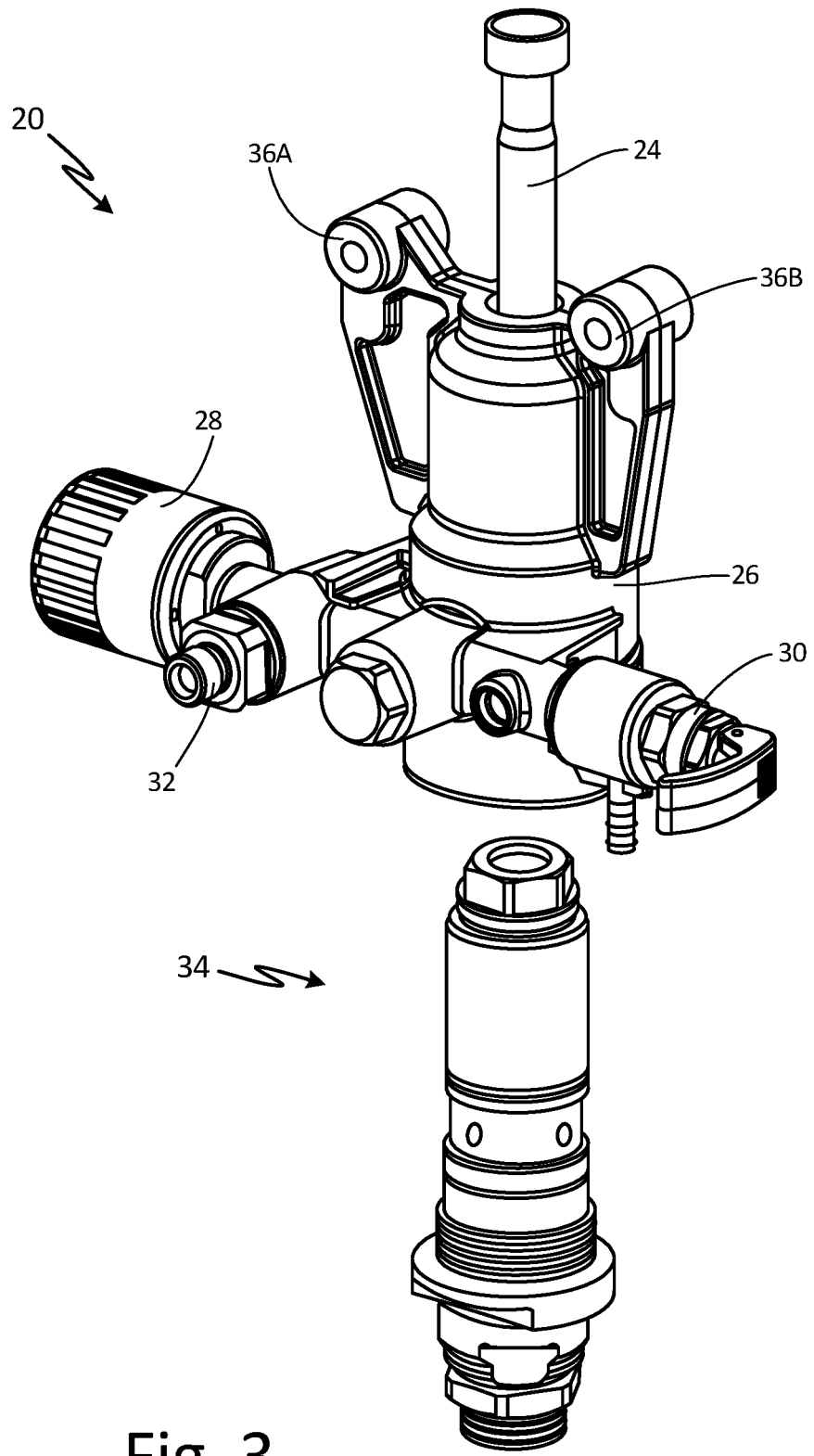
FIG. 3 a perspective view of the piston pump assembly showing a cartridge removed from a pump housing.

FIG. 2 is a perspective view of piston pump assembly 20. FIG. 3 is a perspective view of piston pump assembly 20 showing cartridge 34 removed from pump housing 26. FIGS. 2 and 3 will be discussed together. Piston pump assembly 20 includes piston 24, pump housing 26, pressure control 28, prime control 30, output port 32, and cartridge 34. Pump housing 26 includes mountings 36A and 36B.

Piston 24 of piston pump assembly 20 is cylindrical and extends into an upper end of pump housing 26. A lower end of piston 24 extends within pump housing 26. Piston 24 may be a piston rod or a dual diameter piston. Pump housing 26 is a unitary or integrated body. Pump housing 26 can be formed from metal such as aluminum, steel, brass, or any other suitable metal. Pump housing 26 is strong and capable of withstanding high pressure (e.g. at least 3000 pounds per square inch). Pump housing 26 forms an exterior surface of sprayer 10. In particular, pump housing 26 forms an external portion of sprayer 10 that contains most or all of the pump of sprayer 10. Pump housing 26 has some sections that have a cylindrical profile and some sections that do not have a cylindrical profile. Most sections of pump housing 26 do not have a cylindrical profile. In alternate embodiments, pump housing 26 has a block profile. For example, pump housing 26 can be comprised of one or more cubes or rectangular solid blocks or a combination of cubes and rectangular solid blocks. Further, in alternate embodiments, all or essentially all of pump housing 26 has a cylindrical profile. Pressure control 28 is attached to a first side of pump housing 26 and prime control 30 is attached to a second side of pump housing 26. In alternate embodiments, piston pump assembly 20 does not include pressure control 28 or prime control 30 or both pressure control 28 and prime control 30. Output port 32 is located at a front side of pump housing 26 positioned between pressure control 28 and prime control 30. Cartridge 34 is attached to pump housing 26. More specifically, cartridge 34 extends into a lower end of pump housing 26. As such, an upper end of cartridge 34 is contained within a cavity within pump housing 26 and a lower end of cartridge 34 protrudes from the bottom of pump housing 26.

Pump housing 26 has mountings 36A and 36B, which contain apertures, at a top of pump housing 26. Fasteners such as screws, pins, or any other suitable fastener connected to end bell 12 (shown in FIG. 1) or any other structural component of sprayer 10 may extend through apertures of mountings 36A and 36B. First mounting 36A is at a first side of pump housing 26 and second mounting 36B is at a second side of pump housing 32. In alternate embodiments, mountings 36A and 36B may be in different locations on pump housing 26. In alternate embodiments, pump housing 26 may have any number of mountings including one, three, four, or more than four mountings. Further, in alternate embodiments, mountings 36A and 36B may not be apertures and may be different types of mounting structures.

Pump housing 26 is mechanically supported by end bell 12 (shown in FIG. 1). Pump housing 26 may serve as a paint manifold in which, for example, pumped paint is routed by multiple channels formed in pump housing 26 to one or a combination of pressure control 28, prime control 30, output port 32, or any other suitable location. Pressure control 28 controls pressure regulation of piston pump assembly 20 and prime control 30 controls priming of piston pump assembly 20. Pressure control 28 can be an electrically driven control containing a sensor that is sensitive to the generated paint pressure, a user input for setting the paint pressure such as a rotating knob connected to a potentiometer, and a circuit for closed loop pressure regulation based on the sensor and the setting of the user input. The circuit may control the electric motor to regulate pressure, such as by switching the motor on and off. Pressure control 28 may be a pressure transducer mounted on pump housing 26 to tap into and measure pressure output from piston pump assembly 20 while the pressure control input may be located elsewhere on sprayer 10. Cartridge 34 is removable from pump housing 26, as shown in FIG. 3. Mountings 36 mount pump housing 26 to end bell 12 (shown in FIG. 1) or any other suitable structural component of sprayer 10 or both end bell 12 and any other suitable structural component of sprayer 10. All or essentially all of the load or weight of piston pump assembly 20 can be supported by mountings 36. Cartridge 34 is removable while pump housing 26 remains mounted to a structural component of sprayer 10. A lower end of cartridge 34 protrudes from pump housing 26 to facilitate rotation of cartridge 34 relative to pump housing 26 to unthread and detach cartridge 34 from pump housing 26.

A top end of piston 24 couples to a linkage (not shown) of the reciprocation drive mechanism within sprayer 10 and underneath front cover 16 (shown in FIG. 1). Piston 24 may couple to the linkage by yoke or clamshell connection. A motor or crank (not shown) or other suitable drive mechanism attaches to the top end of piston 24 and reciprocates piston 24 within pump housing 26 to pump paint. Paint enters piston pump assembly through an inlet at a bottom of cartridge 34, which is attached to intake hose 22 (shown in FIG. 1). Paint is forced out of piston pump assembly 20 through output port 32, which is connected to a hose (not shown) and a gun assembly (not shown).

Conventionally, access to internal components of piston pump assembly 20 is gained by removing pump housing 26 from the rest of sprayer 10, such as by detaching pump housing 26 from end bell 12. Removal of pump housing 26 may also require removal of front cover 16 and disassembly of the reciprocation mechanism and may expose the components of the reciprocation mechanism. As such, conventional servicing may require many components not needing service to be removed or exposed in order to access internal components that need service. Cartridge 34 makes access to internal components of piston pump assembly 20 without removing pump housing 26 from end bell 12 or the rest of sprayer 10 possible and easy. As such, cartridge 34 allows for servicing of internal components of piston pump assembly 20 without requiring piston pump assembly 20, or more specifically pump housing 26, to be dismounted from end bell 12 or other components to be removed.

Figure 4:
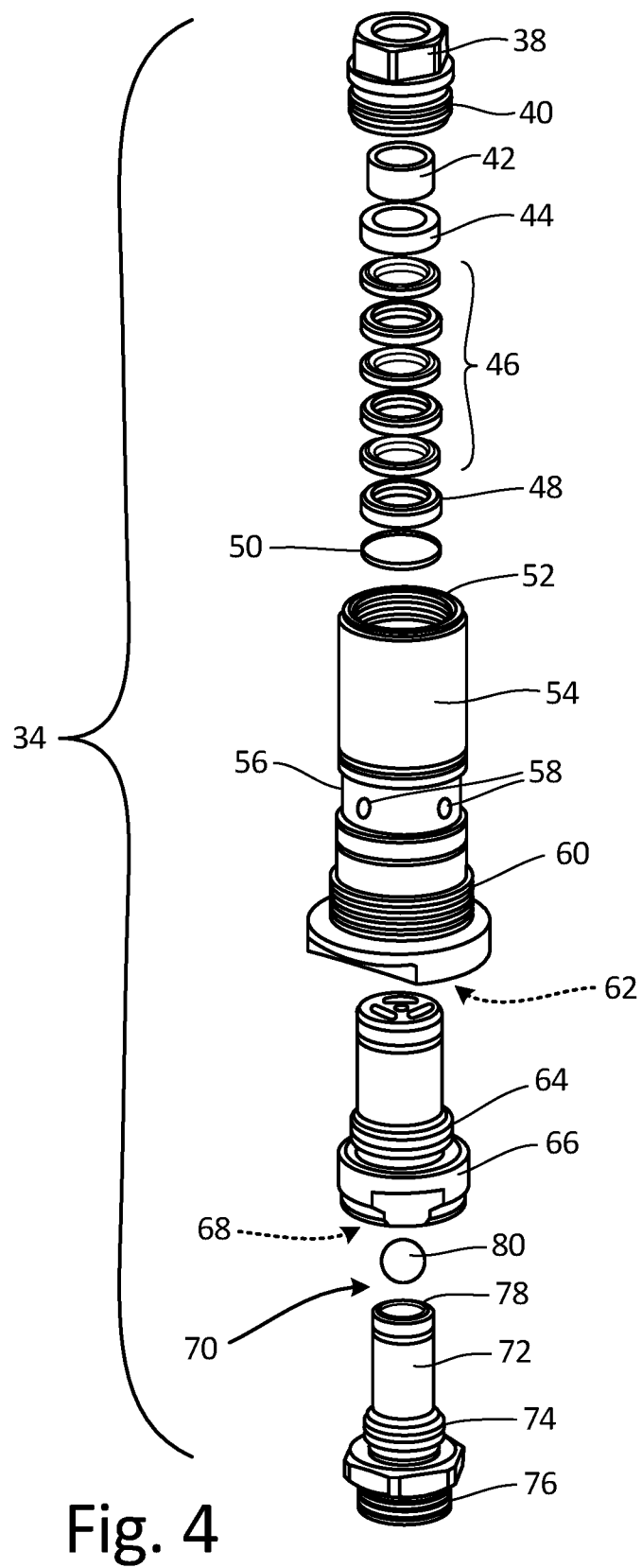
FIG. 4 is an exploded perspective view of the cartridge.

FIG. 4 is an exploded perspective view of cartridge 34. Cartridge 34 includes packing nut 38, external threading 40, wiper seal 42, gland 44, packing stack 46, gland 48, spring 50, internal threading 52, main body 54, groove 56, apertures 58, external threading 60, internal threading 62, external threading 64, ball cage 66, internal threading 68, first valve 70, inlet 72, external threading 74, and external threading 76. First valve 70 includes seat 78 and ball 80.

Cartridge 34 has packing nut 38 at a top end of cartridge 34. Packing nut 38 can be a cylindrical element. Packing nut has external threading 40 that extends around an exterior of packing nut 38 at a lower end of packing nut 38. A top of wiper seal 42 is adjacent the bottom of packing nut 38.

Wiper seal 42 is annular and can be a polymer sealing component. A top of gland 44 is adjacent a bottom of wiper seal 42. Gland 44 is annular. A top of packing stack 46 is adjacent a bottom of gland 44. Packing stack 46 may be made of discrete annular rings or plastic disks. A plastic disk can include one or more o-rings on an outer periphery of the plastic disk. Packing stack 46 may also be a cylindrical polymer body. Packing stack 46 may be a single cylindrical polymer body with ridges. The cylindrical polymer body may have alternating ridges and channels about the circumference of the cylindrical polymer body. Further, packing stack 46 may also be alternating V-cross-sectioned pieces of leather and polymer material such as, for example, ultra high molecular weight polyethylene. In some cases, all of the V-cross-sectioned packings are identical (e.g. all are formed from polymer material). Packing stack 46 may be a single seal or a stack of a plurality of seals. In alternate embodiments, cartridge 34 may include multiple packing stacks 46. A top of gland 48 is adjacent a bottom of packing stack 46. As such, packing stack 46 is sandwiched between glands 44 and 48. Gland 48 is annular. A top of spring 50 is adjacent a bottom of gland 48. Internal threading 52 extends around an interior of main body 54 at an upper end of main body 54. Internal threading 52 couples with external threading 40 on packing nut 38 to couple main body 54 and packing nut 38. Packing nut 38 is coupled with main body 54 such that a lower end of packing nut 38 extends into an upper end of main body 54. Wiper seal 42, gland 44, packing stack 46, gland 48, and spring 50 are all positioned within a cavity or piston bore of main body 54.

Figure 5:
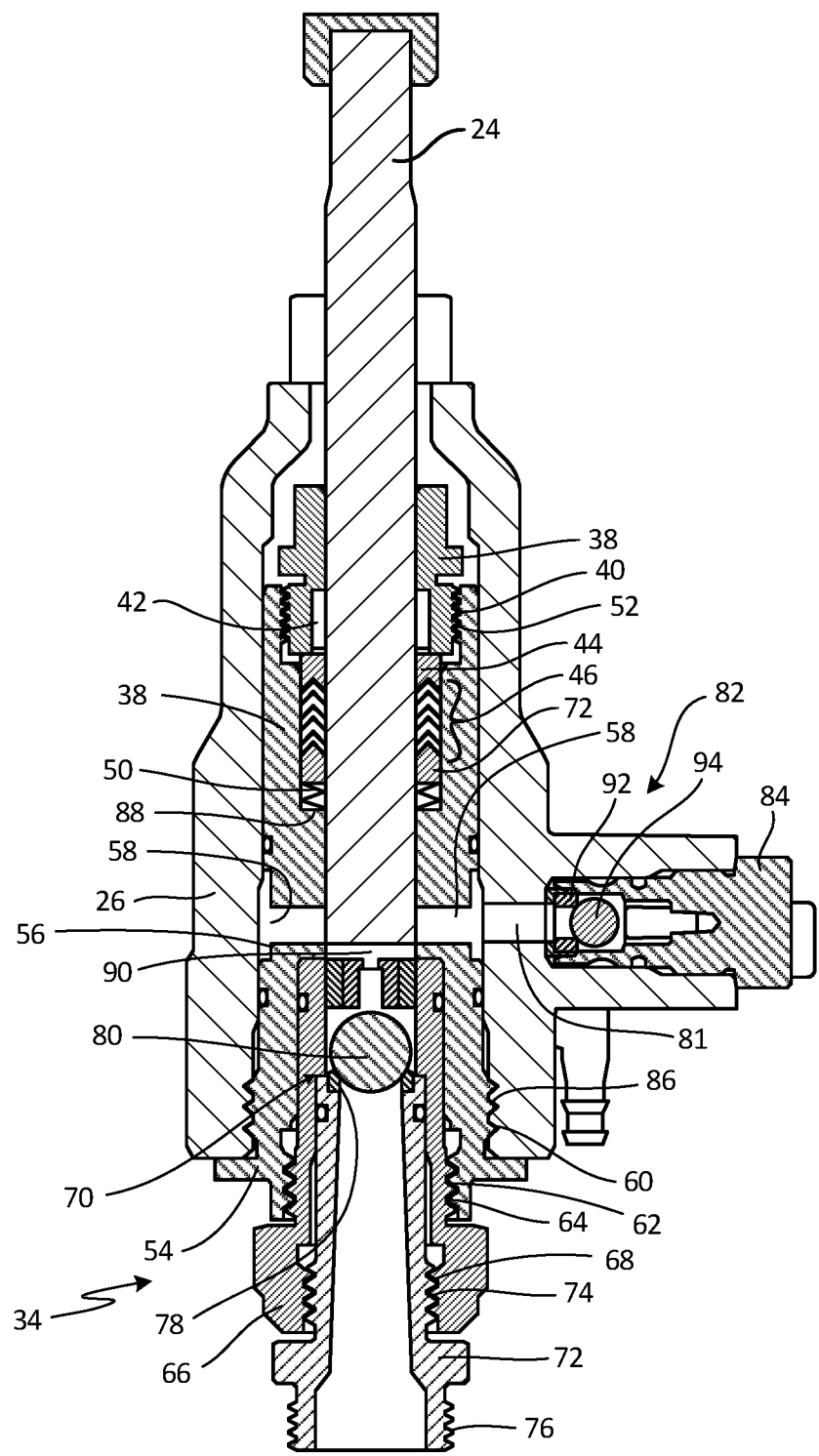
FIG. 5 is a front cross-sectional view of the piston pump assembly taken along line 5-5 of FIG. 2.
Figure 6A:
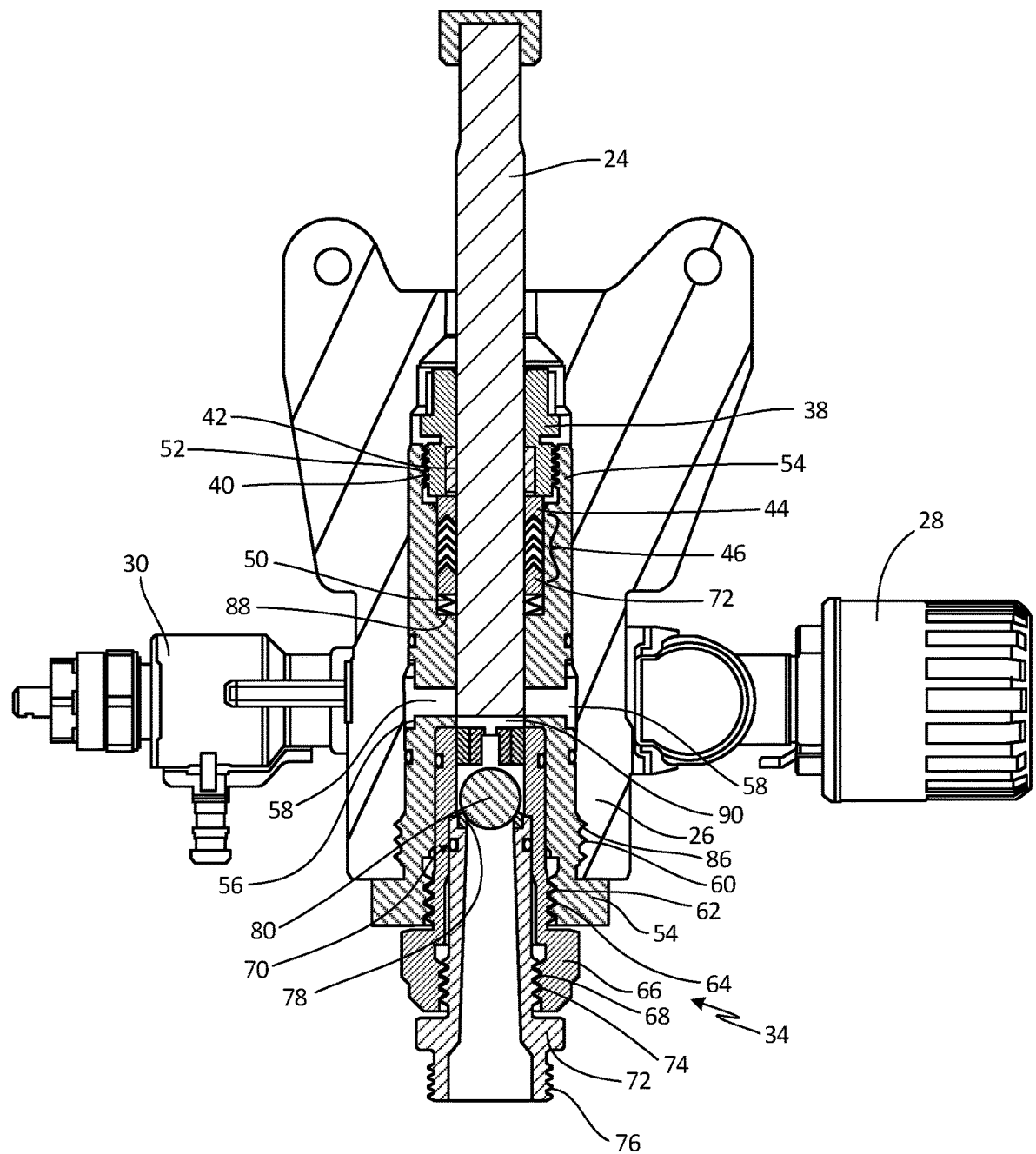
FIG. 6A is a front cross-sectional view of the piston pump assembly taken along line 6-6 of FIG. 2 showing a piston in a downstroke.
Figure 6B:
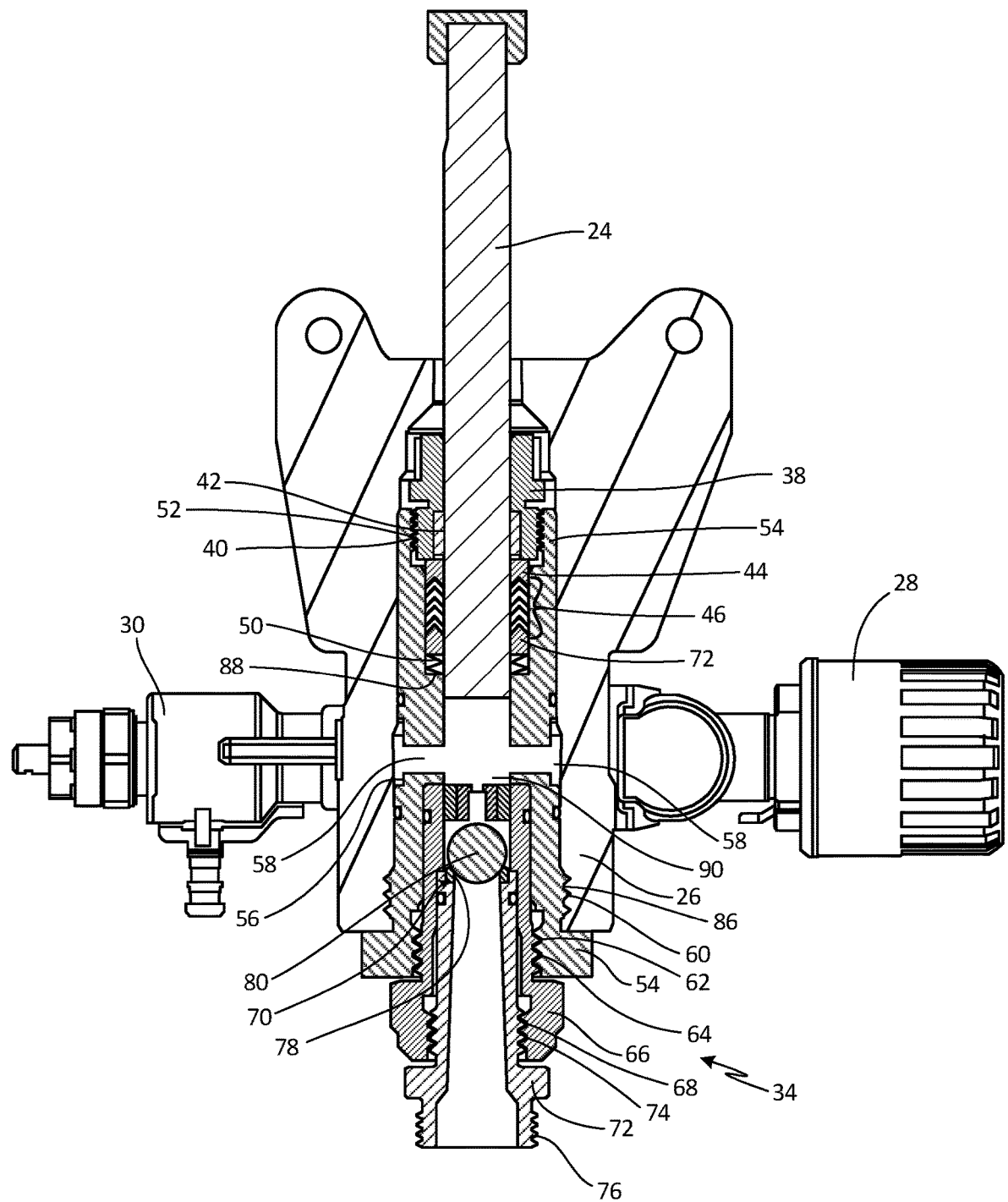
FIG. 6B is a front cross-sectional view of the piston pump assembly taken along line 6-6 of FIG. 2 showing the piston in an upstroke.

Groove 56 extends circumferentially around an exterior of main body 54 between a top of main body 54 and a bottom of main body 54. A top of groove 56 is above apertures 58 and a bottom of groove 56 is below apertures 58 such that apertures 58 are within groove 56. Apertures 58 extend through main body 54. Apertures 58 are passageways from an interior of main body 54 to an exterior of main body 54. Cartridge 34 may include multiple apertures 58. External threading 60 extends around the exterior of main body 54 near a lower end of main body 54. Internal threading 62 extends around the interior of main body 54 at the lower end of main body 54. External threading 64 extends around an exterior of ball cage 66 near a lower end of ball cage 66. External threading 64 couples with internal threading 62 on main body 54 to couple ball cage 66 and main body 54. FIG. 4 indicates the location of internal threading 62. Internal threading 62 is best shown in FIGS. 5, 6A, and 6B. Ball cage 66 is coupled with main body 54 such that a top of ball cage 66 extends into a lower end of main body 54. Internal threading 68 extends around an interior of ball cage 66 at the lower end of ball cage 66. FIG. 4 indicates the location of internal threading 68. Internal threading 68 is best shown in FIGS. 5, 6A, and 6B. First valve 70 is positioned between ball cage 66 and inlet 72. External threading 74 extends around an exterior of inlet 72 near a lower end of inlet 72. External threading 74 couples with internal threading 68 on ball cage 66 to couple inlet 72 and ball cage 66. Inlet 72 is coupled with ball cage 66 such that an upper end of inlet 72 extends into a lower end of ball cage 66. External threading 76 extends around the exterior of inlet 72 at the lower end of inlet 72. External threading 76 couples to intake hose 22 (shown in FIG. 1) to connect intake hose 22 to inlet 54 of cartridge 34 to feed paint from intake hose into piston pump assembly 20 (shown in FIGS. 2 and 3). First valve 70 has seat 78 positioned on a top of inlet 72. Seat 78 sits on the top of inlet 72, may fit within the top of inlet 72, or may sit on and fit within the top of inlet 72. Ball 80 is positioned between seat 78 and ball cage 66.

When packing nut 38 is coupled with main body 54, spring 50 sandwiches gland 44, packing stack 46, and gland 48 against packing nut 38 and an interior surface of main body 54. Packing nut 38 can be decoupled and removed from main body 54 by unthreading internal threading 52 and external threading 40. Unthreading packing nut 38 from the top of main body 54 of cartridge 34 allows packing stack 46, gland 44, gland 48, wiper seal 42, and spring 50 to be removed from the top of main body 54. Ball cage 66 can be decoupled and removed from main body 54 by unthreading internal threading 62 and external threading 64. Unthreading ball cage 66 from main body 54 releases ball cage 66 and inlet 72 from the rest of cartridge 34. Inlet 72 can be decoupled and removed from ball cage 66 by unthreading internal threading 68 and external threading 74. Unthreading inlet 72 from ball cage 66 releases seat 78 and ball 80 of first valve 70 from otherwise being sandwiched between inlet 72 and ball cage 66. Thus, unthreading inlet 72 removes first valve 70 from within cartridge 34.

Wiper seal 42, packing stack 46, spring 50, seat 78, and ball 80 are consumable components. Over time, each of the consumable components and various sealing o-rings may wear out, corrode, or become too dirty for efficient pumping. The components need to be removed from pump housing 26 (shown in FIGS. 2 and 3) for cleaning and replacement. Pump housing 26 may not allow for easy access to and removal of the components, particularly where pump housing 26 is still attached to end bell 12 (shown in FIG. 1), frame 14 (shown in FIG. 1), or any other major structural element of sprayer 10.

In this disclosure, the consumable components are contained within or at least carried by cartridge 34. Cartridge 34 allows for easy one-step removal of the consumable components from pump housing 26. Removing components from cartridge 34 remote from pump housing 26 avoids having to individually remove such components from pump housing 26. After cartridge 34 has been removed from pump housing 26, both the top of cartridge 34 and the bottom of cartridge 34 are easily accessible to remove consumable components. Such components can then be replaced or cleaned. After packing stack 46, gland 44, gland 48, wiper seal 42, spring 50, ball cage 66, first seal 70, and inlet 72 (or additional or alternative components depending on pump design) have been cleaned or replaced, they can easily be packed back into main body 54. Once loaded within or otherwise onto main body 54, cartridge 34 can be inserted into and fixed to pump housing 26.

FIG. 5 is a front cross-sectional view of piston pump assembly 20 taken along line 5-5 of FIG. 2. FIG. 6A is a front cross-sectional view of piston pump assembly 20 taken along line 6-6 of FIG. 2 showing piston 24 in a downstroke. FIG. 6B is a front cross-sectional view of piston pump assembly 20 taken along line 6-6 of FIG. 2 showing piston 24 in an upstroke. FIGS. 5, 6A, and 6B will be discussed together. Piston pump assembly 20 includes piston 24, pump housing 26, having channel 81, pressure control 28 (shown in FIGS. 6A and 6B), prime control 30 (shown in FIGS. 6A and 6B), cartridge 34, second valve 82 (shown in FIG. 5), retainer 84 (shown in FIG. 5), and internal threading 86. Cartridge 34 includes packing nut 38, external threading 40, wiper seal 42, gland 44, packing stack 46, gland 48, spring 50, internal threading 52, main body 54, groove 56, apertures 58, external threading 60, internal threading 62, external threading 64, ball cage 66, internal threading 68, first valve 70, inlet 72, external threading 74, external threading 76, shoulder 88, and chamber 90. First valve 70 includes seat 78 and ball 80. Second valve 82 includes seat 92 and ball 94.

Piston pump assembly 20 has piston 24 extending to an upper end of pump housing 26. A lower end of piston 24 extends within pump housing 26. Channel 81 extends through pump housing 26. Channel 81 is in fluid communication with output port 32 (shown in FIGS. 2 and 3) of piston pump assembly 20. Piston pump assembly 20 may have any number of channels 81 extending through pump housing 26, including one channel 81 or a plurality of channels 81. Pressure control 28 is attached to a first side of pump housing 26 and prime control 30 is attached to a second side of pump housing 26. In alternate embodiments, piston pump assembly 20 does not include pressure control 28 or prime control 30 or both pressure control 28 and prime control 30. Second valve 82, including seat 92 and ball 94, is positioned in pump housing 26 between pressure control 28 and prime control 30. In alternate embodiments, piston pump assembly 20 may not include second valve 82. Retainer 84 is attached to pump housing 26 adjacent second valve 82. Retainer 84 can be inserted into pump housing 26 and is coupled to pump housing 26 via complementary threading or any other suitable means of fixation. Cartridge 34 is attached to pump housing 26. More specifically, a top of cartridge 34 extends into a lower end of pump housing 26. As such, most of cartridge 34 is contained within an interior of pump housing 26. A lower end of cartridge 34 extends outside pump housing 26. Internal threading 86 is located on an interior of pump housing 26 near a lower end of pump housing 26. Internal threading 86 couples with external threading 60 of cartridge 34. When piston extends into an upper end of pump housing 26, piston 24 extends into an upper end of cartridge 34 and through a cavity or piston bore of cartridge 34.

Cartridge 34 has packing nut 38 at a top end of cartridge 34. Packing nut has external threading 40 that extends around an exterior of packing nut 38 at a lower end of packing nut 38. A top of wiper seal 42 is adjacent the bottom of packing nut 38. A top of gland 44 is adjacent a bottom of wiper seal 42. Gland 44 may be fixed to an inner surface of cartridge 34. A top of packing stack 46 is adjacent a bottom of gland 44. Packing stack 46 is adjacent an inner surface of cartridge 34. Packing stack 46 has a cylindrical void through which piston 24 extends. Packing stack 46 is fixed to an inner surface of cartridge 34. In alternate embodiments, packing stack 46 is held on piston 24 and moves relative to the inner surface of cartridge 34. Further, in alternate embodiments, packing stack 46 may be in a different location, such as around a top of piston 24 or around a throat of piston pump assembly 20. A top of gland 48 is adjacent a bottom of packing stack 46. Gland 48 may be fixed to the inner surface of cartridge 34. A top of spring 50 is adjacent a bottom of gland 48. Internal threading 52 extends around an interior of main body 54 at an upper end of main body 54. Internal threading 52 couples with external threading 40 on packing nut 38 to couple main body 54 and packing nut 38. Packing nut 38 is coupled with main body 54 such that a lower end of packing nut 38 extends into the upper end of main body 54. Wiper seal 42, gland 44, packing stack 46, gland 48, and spring 50 are all positioned within main body 54.

Groove 56 extends circumferentially around an exterior of main body 54 between a top of main body 54 and a bottom of main body 54. Apertures 58 are within groove 56. Apertures 58 are passageways from an interior of main body 54 to an exterior of main body 54. Cartridge 34 may include multiple apertures 58. External threading 60 extends around the exterior of main body 54 near a lower end of main body 54. Internal threading 62 extends around the interior of main body 54 at the lower end of main body 54. External threading 64 extends around an exterior of ball cage 66 near a lower end of ball cage 66. External threading 64 couples with internal threading 62 on main body 54 to couple ball cage 66 and main body 54. Ball cage 66 is coupled with main body 54 such that an upper end of ball cage 66 extends into the lower end of main body 54. Internal threading 68 extends around an interior of ball cage 66 at the bottom of ball cage 66. First valve 70 is positioned between ball cage 66 and inlet 72. External threading 74 extends around an exterior of inlet 72 near a lower end of inlet 72. External threading 74 couples with threading 68 on ball cage 66 to couple inlet 72 and ball cage 66. Inlet 72 is coupled with ball cage 66 such that an upper end of inlet 72 extends into the lower end of ball cage 66. External threading 76 extends around the exterior of inlet 72 at the lower end of inlet 72. External threading 76 couples to intake hose 22 (shown in FIG. 1) to connect intake hose 22 to inlet 72 of cartridge 34 for introducing paint into piston pump assembly 20. First valve 70 has seat 78 positioned on a top of inlet 72. Seat 78 sits on the top of inlet 72, may fit within the top of inlet 72, or may sit on and fit within the top of inlet 72. Ball 80 is positioned between seat 78 and ball cage 66.

Cartridge 34 has a main body 38 that extends into a lower end of pump housing 26. When cartridge 34 is coupled to pump housing 26, the majority of the mass of cartridge 34 is located within an interior of pump housing 26. Additionally, first valve 70 contained within cartridge 34 is also contained within pump housing 26. Cartridge 34 is coupled to pump housing 26 via external threading (or connector) 60 and internal threading (or connector) 86. Once threaded in place within pump housing 26, cartridge 34 is fixed in coaxial alignment with piston 24. Inner walls of the portion of cartridge 34 within pump housing 26 define a cavity or piston bore within pump housing 26. The diameter of the cavity or piston bore in cartridge 34 changes along the length of cartridge 34, particularly at shoulder 88. Cartridge 34 has an inner diameter that closely fits the outer circumference of piston 24 below shoulder 88 and an inner diameter that accommodates one or more sealing components between an inner wall of cartridge 34 and the outer circumference of piston 24 above shoulder 88. Chamber 90 is defined by cartridge 34, including main body 54 and ball cage 66, and a bottom of piston 24. Apertures 58 are positioned in main body 54 such that they form passageways from chamber 90 to an exterior of cartridge 34.

While threading 60 and 86 are disclosed as connectors for coupling and decoupling cartridge 34 to pump housing 26, any suitable connector for securely connecting cartridge 34 and pump housing 26 may be used. For example, cartridge 34 may alternatively be fixed to pump housing 26 with a bayonet mount as the connector (e.g. two opposing pegs in either of cartridge 34 or pump housing 26 are respectively received within two slots in the other of cartridge 34 and pump housing 26 and locked by relative rotation, such as a quarter turn, between cartridge 34 and pump housing 26). For another example of a suitable connector, cartridge 34 may be fixed to pump housing 26 by one or more notches or holes in cartridge 34. The notches or holes are orientated orthogonal to a long axis of cartridge 34 and respectively aligned with a hole or holes in pump housing 26 when cartridge 34 is inserted into pump housing 26. Further, the notches and holes accept a pin or other element to lock cartridge 34 within pump housing 26. The connectors may engage and mate to couple (or connect or lock) and disengage to decouple (or disconnect or unlock) cartridge 34 to pump housing 26.

When cartridge 34 is threaded into pump housing 26, piston 24 reciprocates up and down within the cavity or piston bore defined by the inner walls of cartridge 34 within pump housing 26. Piston 24 does not contact any surface of pump housing 26 when reciprocating to operate piston pump assembly 20. The reciprocal motion increases and decreases the volume of chamber 90. Specifically, the volume of chamber 90 decreases on the downstroke of piston 24 (shown in FIG. 6A) and the volume of chamber 90 expands on the upstroke of piston 24 (shown in FIG. 6B). The downstroke of piston 24 forces paint from chamber 90 and out of cartridge 34. Specifically, paint is forced through one or more apertures 58. Apertures 58 may route to groove 56. Paint routed through a particular aperture 58 may flow into groove 56 and around main body 54, possibly mixing with paint from other apertures 58, before flowing through a pump output channel. One aperture 58 may route paint primarily to output port 32 (shown in FIGS. 2 and 3) for spraying. A second aperture 58 may route paint primarily to prime control 30. A third aperture 58 may route paint primarily to another component of piston pump assembly 20. Second valve 82 opens when piston 24 is in a downstroke. The force of the downstroke forces ball 94 from seat 92 and forces paint to flow through second valve 82 and out of piston pump assembly 20. Retainer 84 retains seat 92 and ball 94 within pump housing 26. First valve 70 closes when piston 24 is in a downstroke. More specifically, ball 80 is forced against seat 78 to form a seal and prevent paint from flowing downwards. First valve 70 controls the flow of paint to travel only in the direction from inlet 72 to chamber 90 and not in the reverse direction. As such, first valve 70 prevents retrograde flow of paint past first valve 70.

First valve 70 opens when piston 24 is in an upstroke and paint is flowing upwards (in the illustrated orientation, but it will be understood that such directions are relative based on the orientation and configuration of sprayer 10). The upstroke of piston 24 pulls paint up through inlet 72, through ball cage 66, and into chamber 90 as the volume of chamber 90 expands. Second valve 82 closes when piston 24 is in an upstroke. More specifically, ball 94 is forced against seat 92 to prevent paint from being pulled back into chamber 90. As such, second valve 82 prevents retrograde flow of paint into chamber 90.

Piston 24 moves relative to packing stack 46. Packing stack 46 provides a seal between an inner wall of cartridge 34 and an outer surface of piston 24 to maintain pressure or suction and prevent leakage of paint out of piston pump assembly 20. Wiper seal 42 serves as a backup seal to packing stack 46 to prevent paint from leaking along piston 24 and out of piston pump assembly 20.

Cartridge 34 may be removed from pump housing 26 by unthreading internal threading 86 on pump housing 26 and external threading 60 on main body 54 or by any other suitable decoupling means. Unthreading can be accomplished by rotating cartridge 34 relative to pump housing 26. After unthreading, cartridge 34 can be slid out from inside pump housing 26. Cartridge 34 is removable from pump housing 26 while pump housing 26 remains mounted to sprayer 10. A bottom end of cartridge 34 protrudes from pump housing 26 to facilitate rotation of cartridge 34 relative to pump housing 26 to unthread and detach cartridge 34 from pump housing 26. A top of piston 24 may stay fixed to the crank, yoke, gearing, or other reciprocation mechanism connected to a top of piston 24 to move piston 24 up and down underneath front cover 16 (shown in FIG. 1) or otherwise within sprayer 10 during removal and reinsertion of cartridge 34. As such, piston 24 remains in place, extending through the cavity of pump housing 26, as cartridge 34 is withdrawn from pump housing 26. Upon reinsertion, the lower end of piston 24 may be inserted into the cavity or piston bore defined by cartridge 34 and the annular components within cartridge 34.

Alternatively, piston 24 may be removed from cartridge 34 such that piston 24 at least partially stays within cartridge 34 as cartridge 34 is withdrawn from pump housing 26. In such an embodiment, piston 24 may be attachable to the reciprocation mechanism by a hole-and-pin arrangement. In a hole-and-pin arrangement, a pin extends through a hole in the top of piston 24, the hole extending from a first side of piston 24 to a second side of piston 24, and through a hole in a bracket that is connected to the reciprocation mechanism and aligned with the hole in piston 24. Other attachment means are also possible. Piston 24 can be removed from cartridge 34 after cartridge 34 has been removed from pump housing 26. After servicing, piston 24 can be inserted into cartridge 34 and cartridge 34 can be inserted into the cavity of pump housing 26. The top of piston 24 can then be fastened to the reciprocation mechanism and cartridge 34 can be fixed to pump housing 26.

Removal of cartridge 34 from pump housing 26 also removes consumable components, including wiper seal 42, packing stack 46, spring 50, seat 78, and ball 80, as well as gland 44, gland 48, ball cage 66, inlet 72 from pump housing 26. Packing nut 38 retains wiper seal 42, packing stack 46, and spring 50 within cartridge 34 upon removal of cartridge from pump housing 26. Packing nut 38 may be decoupled from main body 54. Such components can then be removed from cartridge 34. Once removed from pump housing 26, the components within or otherwise supported by cartridge 34 can be removed, replaced, cleaned or otherwise serviced. Retainer 84 can also be removed from pump housing 26 to remove, replace, clean, or otherwise service seat 92 and ball 94 of second valve 82. Cartridge 34 can then be reinserted into and reengaged with pump housing 26 to reinstall cartridge 34.

Consumable components, such as wiper seal 42, packing stack 46, spring 50, seat 78, and ball 80, are replaced several times throughout the life of piston pump assembly 20 while piston 24, pump housing 26, ball cage 66, and inlet 72 may be used for the life of piston pump assembly 20. For example, packing stack 46 may wear out over time due to the high pressure generated by piston pump assembly 20, the dynamic friction of each stroke of piston 24, and the repeated reciprocation cycles of piston 24. Seat 78 and ball 80 can wear out, corrode, and stick depending on the type of fluid pumped within piston pump assembly 20 and the local field environment. As such, piston pump assembly 20 may require servicing.

Cartridge 34 facilitates fast and simple disassembly for servicing of piston pump assembly 20. Cartridge 34 makes access to internal components of piston pump assembly 20 without removing pump housing 26 from end bell 12 or the rest of sprayer 10 possible and easy. For example, pump components such as packing stack 46 can be removed for servicing while leaving pump housing 26 and front cover 16 (shown in FIG. 1) in place or structurally attached to the rest of sprayer 10. Cartridge 34 allows for easy one-step removal of the consumable components from pump housing 26. After components have been cleaned or replaced they can be packed back into cartridge 34 and cartridge 34 can be inserted and fixed to pump housing 26 again.

The scope of this disclosure is not limited to any one design or type of pump. The pump shown in this disclosure represents one out of many possible pump designs. The pump could be, for example, a double action pump with a check valve fixed to the lower end of the piston to expel paint on both upstrokes and downstrokes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid dispensing system comprising:
    a motor housing, wherein a motor is mounted within the motor housing; and
    a piston pump assembly connected to the motor housing, the piston pump assembly configured to pump fluid, the piston pump assembly including:
        a pump housing;
        a cartridge having a unitary main body and a packing stack forming an assembled unit, such that the unitary main body is insertable and removable from the pump housing and supports the packing stack, the unitary main body having a first end and a second end, the first end of the unitary main body extending into a second end of the pump housing and the second end of the unitary main body extending out of the pump housing;
        a piston that extends into a first end of the pump housing and into the first end of the unitary main body; and
        the packing stack within the first end of the unitary main body being adjacent an inner surface of the unitary main body and having the piston extend there through, the packing stack located within the pump housing and between the piston and the pump housing during pumping;
    wherein the first end of the unitary main body of the cartridge is configured to be removed from within the pump housing via the second end of the unitary main body extending out of the pump housing and such removal removes the cartridge as a unit from within the pump housing while leaving the pump housing connected to the motor housing;
    wherein the first end of the unitary main body of the cartridge is configured to be reinserted with either the packing stack or a replacement packing stack as a unit while the pump housing is connected to the motor housing such that the first end of the unitary main body extends into the pump housing with either the packing stack or the replacement packing stack located within the first end of the unitary main body while the second end of the unitary main body extends out of the pump housing; and
    wherein the second end of the unitary main body of the cartridge extends outside the pump housing and is exposed while the first end of the unitary main body is within the pump housing during pumping.

2. The fluid dispensing system of claim 1, wherein the cartridge is configured to be removed from the pump housing while leaving the piston in contact with a drive mechanism.

3. The fluid dispensing system of claim 1, wherein the cartridge includes a connector adjacent an exterior of the cartridge, the connector configured to engage and mate with a mating connector within the pump housing.

4. The fluid dispensing system of claim 3, wherein the connector adjacent an exterior of the cartridge comprises external threading and is configured to lock and unlock the cartridge to the pump housing.

5. The fluid dispensing system of claim 1, wherein the cartridge includes a first valve.

6. The fluid dispensing system of claim 5, wherein the first valve is an inlet check valve.

7. The fluid dispensing system of claim 1, wherein an inlet is configured to be removed from a second end of the cartridge and removal of the inlet removes the first valve from within the cartridge.

8. The fluid dispensing system of claim 1, wherein the cartridge includes:
    a ball cage having a first end that extends into a second end of the unitary main body;
    an inlet having a first end that extends into a second end of the ball cage; and
    a first valve positioned between the ball cage and the inlet.

9. The fluid dispensing system of claim 8, wherein the cartridge further includes a packing nut that extends into the first end of the unitary main body and that retains the packing stack within the cartridge upon removal of the cartridge from the pump housing.

10. The fluid dispensing system of claim 1, wherein the packing stack is a single cylindrical polymer body with ridges.

11. The fluid dispensing system of claim 1, wherein the packing stack is a plurality of annular rings or a plurality of disks.

12. The fluid dispensing system of claim 1, wherein the pump housing is made of metal.

13. The fluid dispensing system of claim 1, wherein the piston is in contact with a drive mechanism.

14. The fluid dispensing system of claim 1, wherein the cartridge is configured to be removed from the pump housing by rotating the cartridge relative to the pump housing.

15. The fluid dispensing system of claim 1, and further including an output port connected to the pump housing.

16. The fluid dispensing system of claim 1, wherein the cartridge includes an inlet for introducing paint into the piston pump assembly.

17. The fluid dispensing system of claim 1, and further comprising an end bell connected to the motor housing, wherein the pump housing is mounted to the end bell.

18. A cartridge including:
    a main body having a first portion and a second portion and including a piston bore;
    a ball cage having a first portion that extends into a second portion of the main body;
    an inlet having a first portion that extends into a second portion of the ball cage and a second portion that extends outside the ball cage;
    a packing stack mounted within the piston bore of the main body;
    a valve having a ball and a seat positioned between the ball cage and the inlet;
    an external connector on an exterior of the main body configured to engage and mate with an internal connector on an interior of a pump housing to connect the cartridge to the pump housing and configured to disengage the internal connector of the pump housing to disconnect and remove the packing stack and the cartridge as a unit from the pump housing while leaving the pump housing in place, such that the valve can be removed from the pump housing with the packing stack and the cartridge as a unit;

an external connector on an exterior of the ball cage configured to engage and mate with an internal connector on an interior of the main body to connect the ball cage to the main body and configured to disengage the internal connector of the main body to disconnect and remove the ball cage from the main body; and an external connector on an exterior of the inlet configured to engage and mate with an internal connector on an interior of the ball cage to connect the inlet to the ball cage and configured to disengage the internal connector of the ball cage to disconnect and remove the inlet from the ball cage.

19. A method servicing a spray pump, the method comprising:

disengaging mating connectors of a pump housing and a cartridge from outside the pump housing, wherein the cartridge comprises;
 a main body having a first end and a second end;
 a packing stack within the first end of the main body, and
 a passageway extending through the main body from an interior of the main body to an exterior of the main body, the passageway located between the packing stack and the second end of the main body;
 wherein the second end of the main body is accessible by extending out of the pump housing while the first end of the main body extends within the pump housing during pumping;

removing the packing stack and the main body as a unit from the pump housing while leaving the pump housing and a piston that extends into the pump housing in place by removing the cartridge as a unit;

servicing at least one component of the cartridge;

reinserting either the packing stack or a replacement packing stack and the main body as a unit into the pump housing, wherein either the packing stack or the replacement packing stack is located within the first end of the main body as the first end of the main body is inserted into the pump housing while the second end of the main body remains outside of the pump housing; and reengaging the mating connectors of the pump housing and the cartridge to reinstall the serviced cartridge.

20. A fluid dispensing system comprising:

a motor housing, wherein a motor is mounted within the motor housing; and a piston pump assembly connected to the motor housing, the piston pump assembly configured to pump fluid, the piston pump assembly including:
 a pump housing;
 a cartridge having a main body having a first end and a second end, the first end of the main body extending into the pump housing and the second end of the main body extending out of the pump housing, and a packing stack within the main body and adjacent an inner surface of the main body;
 a piston that extends into the cartridge and through the packing stack; and
 wherein a passageway extends through the main body of the cartridge from an interior of the main body to an exterior of the main body, the passageway located between the packing stack and the second end of the main body;

wherein the first end of the main body of the cartridge is configured to be removed from within the pump housing via the second end of the main body extending out of the pump housing and such removal removes the packing stack and the main body as a unit from the pump housing while leaving the pump housing connected to the motor housing by removing the cartridge as a unit.

\* \* \* \* \*